Oct. 9, 1923.
C. B. WEAVER
RIVET
Filed Aug. 20, 1919
1,469,977
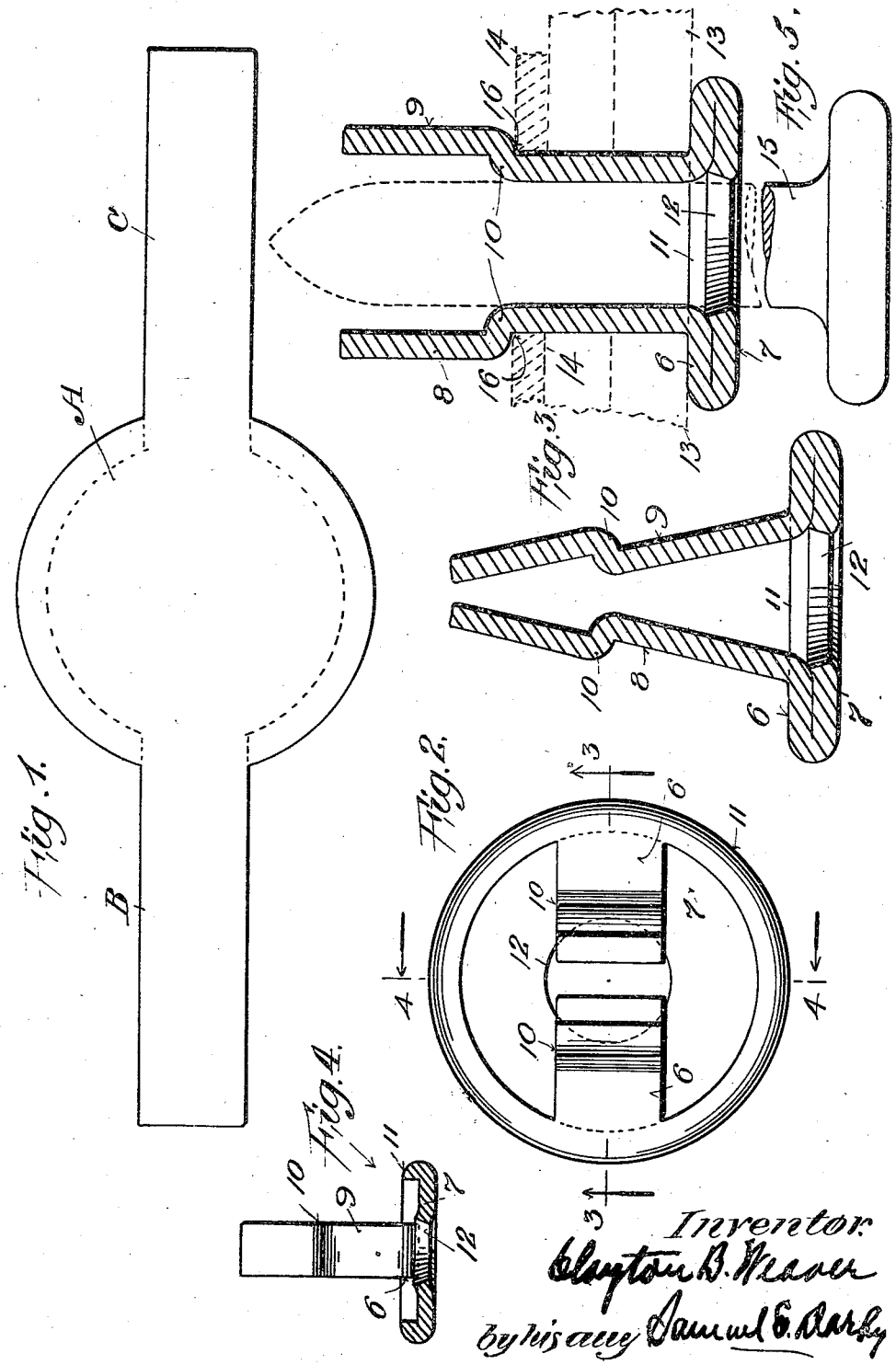

Patented Oct. 9, 1923.

1,469,977

UNITED STATES PATENT OFFICE.

CLAYTON B. WEAVER, DECEASED, LATE OF PHILADELPHIA, PENNSYLVANIA; BY PHEBE WEAVER, EXECUTRIX, OF PHILADELPHIA, PENNSYLVANIA.

RIVET.

Application filed August 20, 1919. Serial No. 318,762.

*To all whom it may concern:*

Be it known that PHEBE WEAVER, a citizen of the United States, residing at Philadelphia, county of Philadelphia, State of Pennsylvania, is the executrix of the last will and testament of CLAYTON B. WEAVER, deceased, formerly of the same address, who invented a certain new and useful Invention in Rivets, of which the following is a specification.

This invention relates to clinch rivets and particularly devices of this nature employed for use in securing parts together.

The object of the invention is to provide a clinch rivet of simple construction and economical to manufacture and which is efficient, strong and durable and capable of being quickly and easily applied for use.

Referring to the accompanying drawing,

Fig. 1 is a view in plan showing a blank from which a clinch rivet embodying the invention is to be formed.

Fig. 2 is an end view of a rivet stamped up from the blank shown in Fig. 1.

Fig. 3 is a view in section on the line 3—3, Fig. 2, looking in the direction of the arrows.

Fig. 4 is a similar view on a smaller scale on the line 4—4, Fig. 2 looking in the direction of the arrows.

Fig. 5 is a view in section on the line 3—3, Fig. 2 showing the application of the clinch rivet for use.

The invention and the application thereof will be described for use in securing upholstery pads to the steel panels of automobile doors although obviously the invention is not to be limited or restricted in respect to the particular use to which the same may be applied.

Heretofore it has been a common practice to secure upholstery pads to the steel panels of automobile doors by means of screws which are passed through the upholstery pads and the steel door panels.

This is not a satisfactory expedient for the reason that appreciable time is required in assembling the holding screws and applying the same. Moreover, the construction of the screws is expensive; the steel door panels must be tapped to receive threads of the screws; and frequently where the panels are very thin, it is customary to employ a reinforcement in order to secure sufficient body to receive the threads of the screw and to retain the screw in its holding relation.

It is among the special purposes of the present invention to avoid these and other difficulties and objections attending the use of screws.

In carrying out the invention a clinch rivet is stamped out from sheet metal, preferably steel, with a head portion and integral legs or prongs bent up from opposite points of the head in angular relation to the plane of the head and the clinch legs of the rivet are formed with shoulders, which, after the rivet has been inserted in place through the registering openings of the parts to be secured together and the legs have been spread apart from each other, engage over the adjacent edge of the inner member of the parts to be secured to retain the rivet in assembled position.

The sheet metal blank, from which the clinch rivet is formed, is shown in Figure 1, and consists of a circular body portion A, with integral tangs or portions B, C, extending from diametrically opposite points of the edge of the body portion A, and which subsequently form the legs of the rivet. By dies, or other suitable instrumentalities, a blank is pressed or drawn into rivet form, as shown in Figures 2, 3 and 4, the tangs B, C being bent or folded over partway across the body portion A, and toward each other, as indicated at 6, and thence said tangs are bent away from the plane of the head portion 7 of the rivet, and normally in position inclined toward each other, to form the legs 8, 9, of the rivet. A shoulder 10 is formed in each leg, by deflecting or bending the free end portion of the leg laterally out of the plane of the other portion of the leg as clearly shown in Fig. 3. The peripheral edge 11 of the body A of the blank is likewise pressed or bent up as shown in Fig. 4 to form a raised rim at the peripheral edge of the head 7 of the clip. In practice, this raised rib portion 11 should extend to approximately the level of the plane of the inner surface of the bend 6 of the legs 8, 9. An opening 12 is punched centrally through the head 7 of the rivet.

In order to apply a rivet embodying the invention the parts 13, 14 to be secured together, thereby, for instance the upholstery pad and sheet steel door panel respectively of an automobile door are assembled together and a hole or opening punched through the assembled members. The legs 8, 9, inclined toward each other, as shown in Fig. 3 are then inserted through the holes or openings in the members to be secured together until the head of the rivet impinges against the outer surface of the member 13. A suitable tool, indicated at 15, is then inserted through the central opening 12 in the head of the rivet, and through the holes punched in the members 13, 14. This tool engages the inner or opposed faces of the legs 8, 9, and forces them apart or away from each other, and into substantially parallel relation with respect to each other for the shoulders 10 therein to engage over the approximate edge portions 16 of the panel 14, as shown in Fig. 5, thereby clinching the legs of the rivet in position to hold the assembled parts 13, 14, together.

It will be seen from the foregoing description that an exceedingly simple and efficient clinch rivet is provided which can be manufactured easily, quickly and economically by stamping the same out of sheet metal, thereby avoiding the necessity for screw threading or tapping the hole punched through the panel 14 or other part to which the rivet is to be applied, and also avoiding the necessity of providing reinforcements to receive screw threads in the case of thin panel members 14. It will also be seen that in the use of the invention the application is easily effected of upholstering pads, for example, to sheet metal door panels, after assembling the panel into the door and where the surface of the panel, which is engaged by the shoulders 10 of the applied rivet, forms the wall of a door pocket, which is inaccessible for bending the legs of a rivet thereover. It will be observed that the tool 15 is required merely to be pushed through the center of the opening 12 of the head of the rivet and between the legs of the rivet and then removed. This action straightens out the two legs or prongs.

It will be understood, of course, that these rivets may be made in different sizes for different purposes, and as above indicated, they may be used in any position or relation where the use thereof may be desired, and they are particularly suited for use where they are to be applied from the outside of the receptacle or chamber which is otherwise inaccessible.

Having now set forth the objects and nature of the invention and a construction embodying the principles thereof, what is claimed as new and useful, and of the invention of the said CLAYTON B. WEAVER is:

1. A clinch rivet having a head portion and prongs or legs formed integral therewith and extending in inclined relation toward each other, and laterally away from the head portion, said legs or prongs having shoulders formed therein to engage over the adjacent surface of a part to which the rivet is to be applied.

2. A sheet metal clinch rivet having a body or head, and legs or prongs integrally connected to the head or body at respectively opposite points, said legs or prongs being bent over upon and partway across the head portion, and inclined toward each other, and having bends or shoulders therein, said body portion having an upturned bounding edge or rim, said prongs or shoulders adapted when inserted in position for use to be spread apart, or away from each other for the shoulders therein to engage over a part to be assembled to hold the rivet in place.

3. A metallic clinch rivet having a head portion and leg portions formed integrally therewith at diametrically opposite points, said leg portions being bent or folded over upon and partway across the body portion, and thence laterally away from the plane of the body portion and having laterally bent or opposite shoulders therein, said body portion having a central hole or opening therethrough.

4. A clinch rivet comprising a head perforated at its center and a pair of legs or prongs projecting laterally from said head, said legs or prongs having portions inclined towards each other whereby a tool inserted through said perforation will contact with such portions causing the legs to spread apart, and means operative when the legs are spread apart to prevent the withdrawal of the rivet.

5. A clinch rivet comprising a centrally perforated head and a pair of laterally extending legs or prongs projecting from said head, said legs or prongs having portions projecting in the path of a tool inserted through the central perforation of the head, so that the passage of such tool will displace the legs or prongs apart from each other and into locking position.

In testimony whereof I have set my hand on this 7th day of August A. D., 1919.

PHEBE WEAVER,
*Executrix of the last will and testament of Clayton B. Weaver, deceased.*